(12) United States Patent
Kuroda et al.

(10) Patent No.: US 6,434,453 B1
(45) Date of Patent: Aug. 13, 2002

(54) ENGINE CONTROL SYSTEM FOR HYBRID VEHICLE

(75) Inventors: Shigetaka Kuroda; Atsushi Matsubara; Atsushi Izumiura; Takashi Kiyomiya; Hideyuki Oki, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/519,846

(22) Filed: Mar. 6, 2000

(30) Foreign Application Priority Data

Mar. 9, 1999 (JP) .......................... 11-062412

(51) Int. Cl.[7] ................................ G06F 7/00
(52) U.S. Cl. .................. 701/22; 701/86; 701/110; 701/112; 701/121; 477/187; 123/325
(58) Field of Search .................. 701/22, 86, 101, 701/103, 104, 110, 112, 121, 123; 477/187; 123/351, 325, 350, 493

(56) References Cited

U.S. PATENT DOCUMENTS

| | | | | |
|---|---|---|---|---|
| 4,253,437 A | * | 3/1981 | Haramoto | 123/325 |
| 4,454,789 A | * | 6/1984 | Kaspar et al. | 74/850 |
| 4,769,774 A | * | 9/1988 | Narita et al. | 701/22 |
| 5,271,368 A | * | 12/1993 | Fujii et al. | 123/493 |
| 5,762,581 A | * | 6/1998 | Kozaki et al. | 477/174 |
| 6,032,869 A | * | 3/2000 | Ito et al. | 237/12.3 B |

FOREIGN PATENT DOCUMENTS

| | | |
|---|---|---|
| DE | 198 43 925 | 4/1999 |
| DE | 100 09 657 | 1/2001 |
| DE | 199 36 885 | 2/2001 |
| JP | 8-317505 | 11/1996 |
| JP | 10-306739 | 11/1998 |

* cited by examiner

*Primary Examiner*—Gertrude Arthur
(74) *Attorney, Agent, or Firm*—Armstrong, Westerman & Hattori, LLP (57) ABSTRACT

An engine control system for a hybrid vehicle having an internal combustion engine and an electric motor as driving force sources, for permitting stopping and restarting of the engine in accordance with predetermined drive conditions. The engine control system includes a fuel cutter for cutting fuel supply to the engine when the vehicle decelerates and an engine speed detector for detecting an engine speed. Stopping of the engine is initiated by cutting the fuel supply by the fuel cutter, and when the engine speed becomes equal to or lower than a predetermined speed, the engine is stopped by operating the motor as a generator and by cutting the fuel supply.

3 Claims, 7 Drawing Sheets

ENGINE CONTROL SYSTEM FOR HYBRID VEHICLE

BACKGROUND OF THE INVENTION

1. Field of the Invention

This invention relates to an engine control system for a hybrid vehicle, and more particularly, to an engine control system which can prevent vibration of a vehicle body which occurs until the engine speed becomes "0" after deceleration fuel supply cut is performed.

This application is based on Japanese Patent Application No. 11-62412, the contents of which are incorporated herein by reference.

2. Description of the Related Art

Conventionally, hybrid vehicles which carry motors as power sources for driving the vehicles in addition to engines are known. Hybrid vehicles are divided into series hybrid vehicles and parallel hybrid vehicles. In the series hybrid vehicles, the engine drives a generator whose electric power output is used to drive the motor, which in turn drives the wheels. In the parallel hybrid vehicles, the motor coupled to the engine assists the rotation of the drive shaft of the engine while charging a battery with electric energy using the motor itself as a generator or using a separate generator.

Because the engines of such hybrid vehicles can constantly run within the engine-speed range of a high fuel mileage and a low emissions level or their drive loads can be reduced, the hybrid vehicles can achieve lower fuel consumption and lower emissions levels than conventional engine vehicles.

As disclosed in, for example, Japanese Unexamined Patent Application, First Publication Hei 8-317505, some of those hybrid vehicles are designed to be capable of stopping the operation of the engine in accordance with predetermined driving conditions.

Because of the ability to stop the operation of the engine, such a hybrid vehicle is superb in preventing over-charging of the battery or achieving a further improvement in fuel consumption but has the following problem.

If the fuel supply is cut before the engine is stopped, the engine speed gradually decreases after the fuel is cut. Before the engine speed finally becomes "0", the frequency resonance points of both the vehicle body and the drive system may coincide with each other depending on the vehicle speed and the number of rotations of the drive system. This inevitably causes vibration of the vehicle body, which is likely to make the driver feel uncomfortable.

SUMMARY OF THE INVENTION

Accordingly, it is an object of the present invention to provide an engine control system for a hybrid vehicle, which can eliminate uncomfortable vibrations of the vehicle body by allowing the engine to swiftly leave the state where the engine speed causes such resonance.

To achieve this object, according to one aspect of this invention, an engine control system for a hybrid vehicle, having an internal combustion engine (e.g., an engine E in one embodiment) and an electric motor (e.g., a motor M in the embodiment) as driving force sources, for cutting fuel supply to the engine when the vehicle decelerates and permits stopping and restarting of the engine in accordance with predetermined drive conditions, comprises: a fuel cutter (e.g., steps S129 and S320 in the embodiment); and an engine speed detector (e.g., an engine speed sensor $S_5$ in the embodiment) for detecting an engine speed (e.g., an engine speed NE in the embodiment), wherein stopping the engine is initiated by cutting the fuel supply by the fuel cutter, and when the engine speed becomes equal to or lower than a predetermined speed (e.g., an engine-stopping/enforced-regeneration-starting upper speed limit NEIDLSTH in the embodiment), the engine is stopped by operating the motor as a generator and by cutting the fuel supply.

When the fuel supply to the engine is stopped by the fuel cutter and the engine speed falls to or below a predetermined speed, the vehicle body tends to vibrate. At this point of time, the motor is permitted to work as a generator to apply a load to the engine and the fuel is cut, thereby promptly making the engine speed "0".

The predetermined drive conditions for stopping the engine are, for example, such that on the premise that the engine can be started by the motor (e.g., when a motor-start enable/disable flag F_MOTSTB is "1" in step S106 in the embodiment), the amount of the remaining battery charge (or the state of charge) SOC is equal to or above an over-discharge area (e.g., an energy-storage-zone flag F_ESZONE is "0" in step S107 in the embodiment), and the engine coolant temperature TW is equal to or higher than a predetermined level (e.g., the coolant temperature TW is equal to or higher than a coolant-temperature lower limit TWFCMG in step S108 in the embodiment).

In this engine control system, the predetermined speed may be set in a resonance frequency band of a vehicle body and a drive system (e.g., between the engine-stopping/enforced-regeneration-starting upper speed limit NEIDLSTH and an engine-stopping/enforced-regeneration-starting lower speed limit NEIDLSTL), which is equal to or lower than an idling speed.

With this structure, when vibration with a large amplitude tends to occur at a speed equal to or lower than the idling speed, the motor is permitted to work as a generator to apply a load to the engine, thereby promptly making the engine speed "0". This can make extremely short the time during which the engine speed falls within the resonance frequency band, and can allow the engine speed to quickly leave from the resonance frequency band.

In the above engine control system, a fuel supply restarting engine speed for restarting fuel supply is set in the fuel cutter, and once engine stop control is initiated, the engine stop control is maintained and the fuel cutting continues even when the engine speed falls to the fuel supply restarting engine speed. This can suppress the occurrence of uncomfortable vibrations to an extremely short time.

DETAILED DESCRIPTION OF THE PREFERRED EMBODIMENT

A preferred embodiment of the present invention will be explained with reference to the accompanying drawings.

Figure 1:
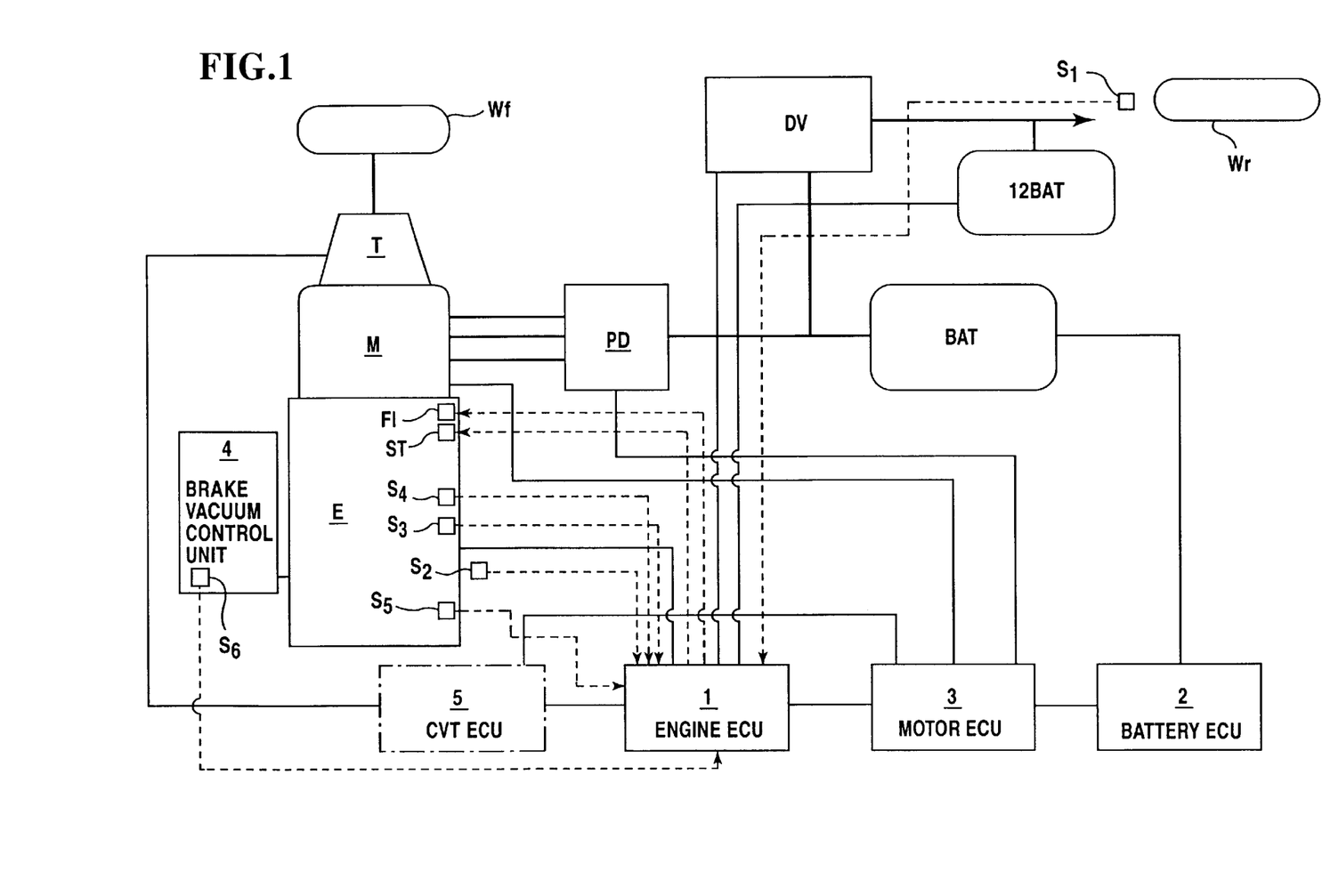
FIG. 1 is a schematic diagram showing the overall structure of one embodiment of this invention.

FIG. 1 is a schematic diagram showing the overall structure of a parallel hybrid vehicle, specifically, a hybrid vehicle having a manual transmission system installed therein (including a vehicle in which a CVT (Continuously Variable Transmission) is installed). Driving forces from both an engine E and a motor M are transmitted via a transmission T. such as an automatic transmission or a manual transmission, to front wheels Wf which are the drive wheels. When the hybrid vehicle decelerates and the driving force is transmitted from the front wheels Wf to the motor M, the motor M acts as a generator to generate so-called regenerative braking force, so that the kinetic energy of the vehicle body is stored as electric energy.

A power drive unit PD performs the driving and regeneration of the motor M in response to control commands from a motor ECU 3. A high-voltage battery BAT for sending and receiving electric energy to and from the motor M is connected to the power drive unit PD. The battery BAT includes a number of modules connected in series, each module having a number of cells connected in series. The hybrid vehicle includes a 12-volt auxiliary battery 12BAT for driving various accessories. The auxiliary battery 12BAT is connected to the battery BAT via a downverter DV. The downverter DV, controlled by an engine ECU 1, reduces the voltage from the battery BAT and charges the auxiliary battery 12BAT.

A battery ECU 2, for example, computes the remaining charge (or the state of charge) SOC of the battery BAT. In FIG. 1, reference numeral "4" denotes a brake vacuum control unit, and the broken-line block 5 is a CVTECU.

The engine ECU 1 controls fuel supply amount controller F1 for controlling the amount of fuel supplied to the engine E, a starter motor ST, an ignition timing, etc. in addition to the motor ECU 3 and the downverter DV.

Therefore, the engine ECU 1 receives SOC information on the battery remaining charge from the battery ECU 2, motor information from the motor ECU 3 and signals from various sensors and various switches. The sensors include a vehicle speed (V) sensor $S_1$, a throttle-opening-state (TH) sensor $S_2$, engine coolant temperature (TW) sensor $S_3$, an engine intake-air temperature (TA) sensor $S_4$, an engine speed (NE) sensor $S_5$. and a brakevacuum sensor $S_6$ for detecting the brake-master-power negative pressure. Those switches, though not illustrated, include an ignition switch, a reverse switch, a brake switch, a neutral switch and a clutch switch.

Based on the signals from the various sensors and the various switches, the SOC information and the motor information, the engine ECU 1 performs fuel supply cut and starting of the engine.

For a CVT-installed vehicle, N (Neutral), P (Parking) and R (Reverse) position switches are provided in addition to the neutral switch, reverse switch and clutch switch.

Figure 2:
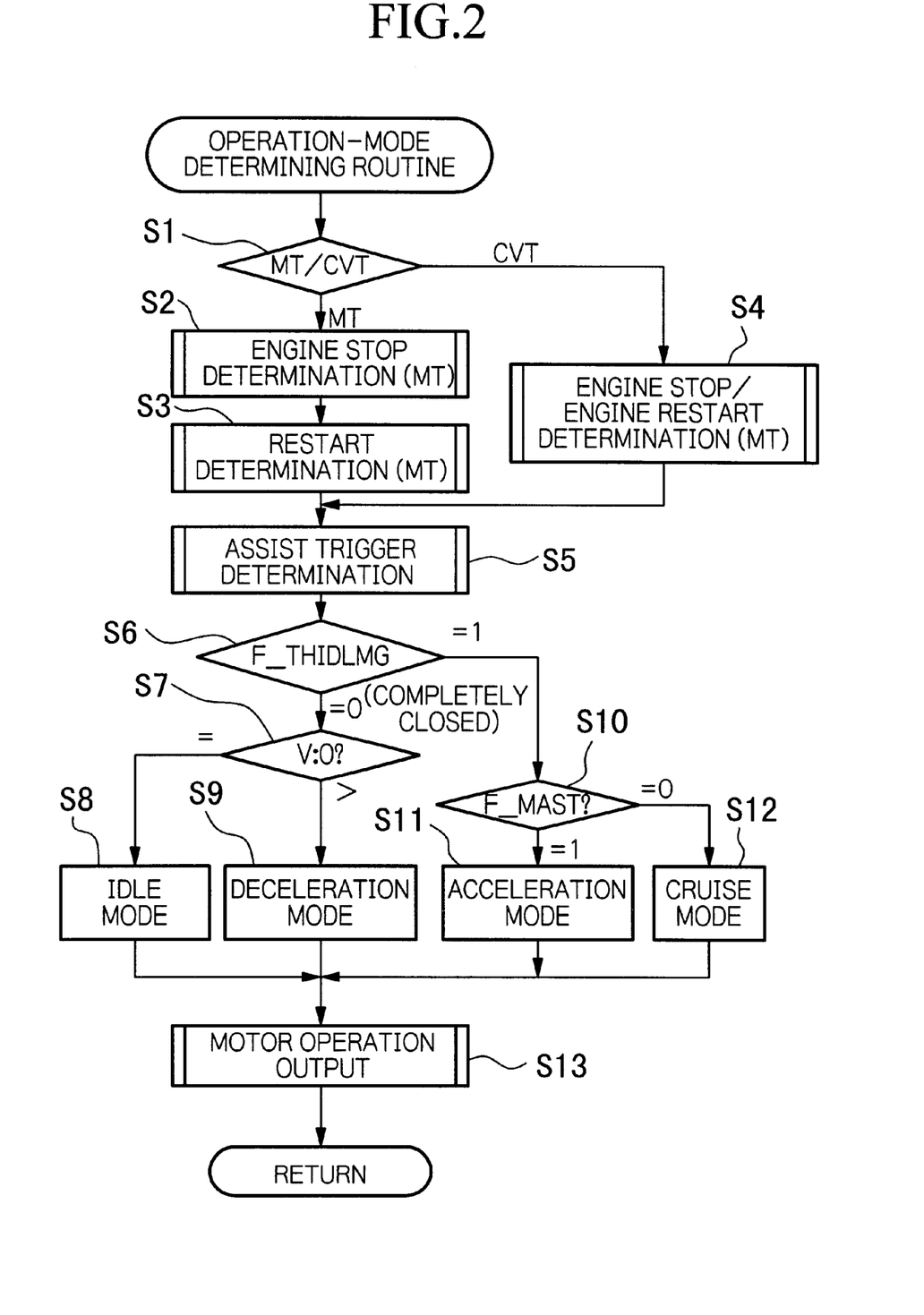
FIG. 2 is a flowchart showing a routine for determining the operation mode of a motor.

Referring to the flowchart of FIG. 2, the control mode for the motor of this hybrid vehicle will be explained.

In step S1, it is determined whether the vehicle is a manual transmission (MT) vehicle or a CVT vehicle. When it is determined that the vehicle is an MT vehicle, an engine stop determination (for MT vehicle) which will be discussed later is carried out in step S2. Then, a restart determination is performed in step S3 after which the flow proceeds to step S5.

When it is determined in step S1 that the vehicle is a CVT vehicle, an engine stop/engine restart determination (for CVT vehicle) which will be discussed later is performed in step S4. Then, the flow proceeds to step S5.

In step S5, an assist trigger determination is executed to determine whether or not to carry out assist by the motor. There are various assisting methods; for example, the determination can be made based on parameters such as the throttle opening state (e.g., throttle opening degree, or throttle opening amount) and the vehicle speed. Then, it is determined in step S6 whether the throttle is completely closed based on a throttle-completely-closed-state flag F_THIDLMG.

When in step S6 the throttle-completely-closed-state flag F_THIDLMG is "0", that is, when it is determined that the throttle valve is completely closed, and when it is determined in step S7 that the vehicle speed V is "0", that is, the vehicle is not running, the "idle mode" is selected in step S8, so that the engine E is maintained in an idling state.

When in step S6 the throttle-completely-closed-state flag F_THIDLMG is "0", that is, when it is determined that the throttle valve is completely closed, and when it is determined in step S7 that the vehicle speed V is not "0", the "deceleration mode" is selected in step S9 and regenerative braking by the motor M is carried out. Further, the regeneration energy is stored to charge the battery.

When in step S6 the throttle-completely-closed-state flag F_THIDLMG is "1", that is, when it is determined that the throttle valve is open, the flow proceeds to step S10. In this step S10, it is determined based on a motor assist flag F_MAST whether to select the "acceleration mode" or the "cruise mode".

When it is determined in step S5 that the assist by the motor M is required, and when it is determined in step S10 that the motor assist flag F_MAST is "1", the "acceleration mode" is selected in step S11, and the motor M assists the driving force of the engine E. When it is determined in step S10 that the motor assist flag F_MAST is "0", the "cruise mode" is selected in step S12, and the motor M is not driven so that the vehicle runs only on the driving force from the engine E. Accordingly, step S13 provides the output from the motor corresponding to each mode.

The following describes the "engine stop determination (MT)", the "restart determination" and the "engine stop/engine restart determination (CVT)" in the above-described flowchart.

Figure 3:
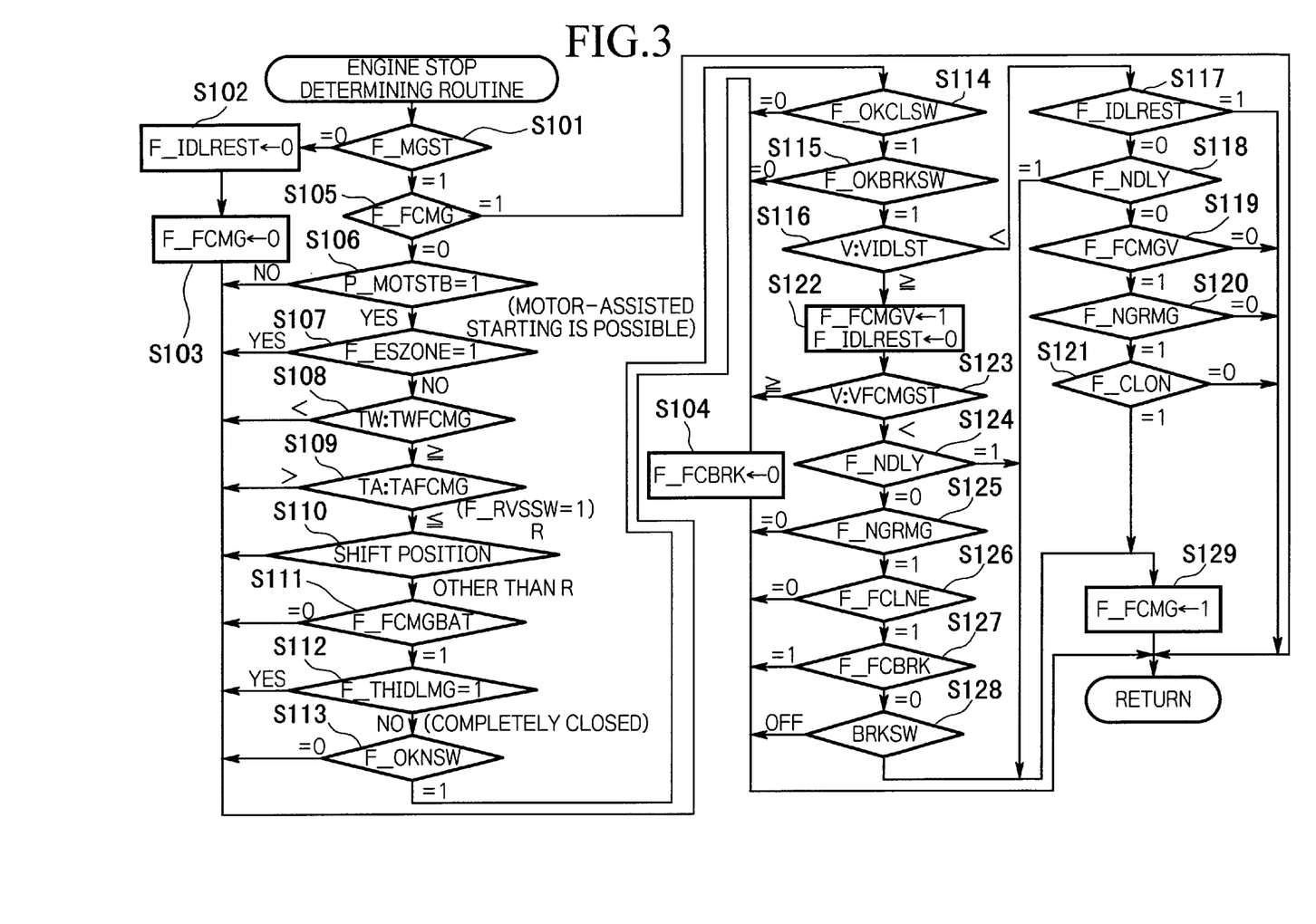
FIG. 3 is a flowchart illustrating a routine for determining whether or not to stop the engine of an MT vehicle.

Now, the engine stop determination for an MT vehicle will be discussed. In the engine stop determination, specifically, whether or not to permit the engine to stop is determined according to the running conditions of the engine and the driver's operation, basically on the condition that stopping the engine is permitted only when the start of the engine can be assisted by the motor.

FIG. 3 is a flowchart illustrating a routine for determining whether or not to stop the engine of an MT vehicle. The state of a start-switch-ON start flag F_MGST is determined in step S101 in this flowchart. When the start-switch-ON start flag F_MGST is "0", that is, when it is the first running, a restart flag F_IDLREST for restarting the engine by opening the throttle is set to "0" in step S102. Then, the engine-stop control execution flag F_FCMG is set to "0" in the next step S103. In the next step S104, "0" is set to a flag F_FCBRK which indicates that the brake is released while fuel supply cut originated from deceleration is continuing, after which the flow returns.

That is, at the time of first running, the individual flags are initialized by the operation from the ON action of the ignition switch to the ON action of the start switch.

When it is determined in step S101 that the start-switch-ON start flag F_MGST is "1" or it is not the first running, the state of the engine-stop control execution flag F_FCMG is checked in step S105. The decision here is made to distinguish the condition for stopping the engine from the condition for restarting the engine after the engine has stopped. When the flag F_FCMG was already "1", this step is passed and the flow returns to the operation-mode determining routine to execute the restart determination.

When it is determined that the engine-stop control execution flag F_FCMG is "0", it is then determined in step S106 if the motor start enable flag F_MOTSTB is "1", that is, if the starting of the engine by the motor is possible. Whether or not the start of the engine can be performed by the motor is checked by signals from the motor ECU 3. When it is determined that the flag F_MOTSTB is "0", the starting of the engine by the motor is not possible so that the flow goes to step S104. When it is determined that the flag F_MOTSTB is "1", the flow goes to step S107. Thus, if the starting of the engine by the motor is not possible, therefore, the engine will not be stopped.

In step S107, it is determined if the energy-storage-zone flag F_ESZONE is "1", that is, the battery's remaining charge SOC is in an over-discharge zone (e.g., 20% or smaller). This prevents the engine from being stopped when the battery's remaining charge is not much.

When the energy-storage-zone flag F_ESZONE is "1", that is, when it is determined that the battery's remaining charge SOC is in the over-discharge zone, the flow proceeds to step S104. When it is determined that this flag F_ESZONE is "0", i.e., that the battery's remaining charge SOC is not in the over-discharge zone, the coolant temperature TW is compared with the coolant-temperature lower limit TWFCMG (e.g., 40° C.) for stopping the engine in step S108.

When it is determined that the coolant temperature TW is lower than the coolant-temperature lower limit TWFCMG, the flow goes to step S104. This prevents the engine from being stopped when it is not in a fully warmed-up state. When it is determined that the coolant temperature TW is equal to or higher than the coolant-temperature lower limit TWFCMG, the intake-air temperature TA is compared with an intake-air temperature upper limit TAFCMG (e.g., 40° C.) for stopping the engine in step S109.

When it is determined that the intake-air temperature TA is higher than the intake-air temperature upper limit TAFCMG, the flow proceeds to step S104. Accordingly, when the intake-air temperature is high, the engine is not stopped in consideration of the deterioration of the startability and the air conditioning performance that should be secured. When it is determined that the intake-air temperature TA is equal to or lower than the intake-air temperature upper limit TAFCMG for stopping the engine, the flow proceeds to step S110.

In step S110, it is determined whether or not the shift position is the position R (Reverse). When a reverse switch flag F_RVSSW is "1", that is, when it is determined that the shift position is the position R, the flow proceeds to step S104. This prevents the engine from being stopped when the vehicle starts or stops at a low speed in the reverse mode, thus improving the operability. When it is determined that the shift position is other than the position R, the state of a large-consumption-in-12V-system and restart enable flag F_FCMGBAT is determined in step S111. When it is determined that this flag F_FCMGBAT is "0", that is, when restarting the engine is not possible due to large consumption in the 12V system, the flow advances to step S104. When it is determined that the flag F_FCMGBAT is "1", that is, when restarting the engine is possible even with large consumption in the 12V system, the flow advances to step S112.

In step S112, it is determined whether or not the throttle-completely-closed-state flag F_THIDLMG is "1". When the flag F_THIDLMG is "1", that is, when it is determined that the throttle is not completely closed, the flow advances to step S104. As a result, the engine is not stopped. When the flag F_ITHIDLMG is "0", that is, when it is determined that the throttle is completely closed, the flow advances to step S113.

In step S113, the state of a neutral-switch-OK flag F_OKNSW is determined, and then the state of a clutch-switch-OK flag F_OKCLSW is determined in step S114. In the next step S115, the state of a brake-switch-OK flag F_OKBRKSW is determined.

Those steps S113, S114 and S115 determine if their associated switches are functioning adequately. When the switches are not failing, the respective flags are set to "1". When it is determined that the individual switches are normal, the flow advances to step S116. When each flag value is "0" because the associated switch is abnormal or is not checked as normal, the flow goes to step S104.

In step S116, the vehicle speed V is compared with an engine-stop-at-low-speed determining vehicle speed VIDLST (e.g., 3 km/h). This comparison allows fuel supply cut while the vehicle is running (at and after step S122) and the engine to be stopped when the vehicle is stopped (at and after step S117). This can improve the fuel consumption.

When it is determined in step S116 that the vehicle speed V is lower than the engine-stop-at-low-speed determining vehicle speed VIDLST, the state of the restart flag F_IDLREST for restarting the engine by opening the throttle is determined in step S117. When the flag F_IDLREST is "1" or when it is determined that the throttle is opened, the flow returns. Accordingly, when the engine is restarted by turning the ignition switch ON or opening the throttle while the engine is stopped, this flag value becomes "1" and the engine will not be stopped again until the vehicle starts moving.

When it is determined that the restart flag F_IDLREST is "0", the flow advances to step S118. In this step S118, the state of a neutral keeping flag F_NDLY is determined. When the neutral keeping flag F_NDLY is "1", that is, when it is determined that the neutral state is maintained for a predetermined time, the flow goes to step S129. When it is determined that this flag F_NDLY is "0", the flow goes to step S119 which determines the state of a flag F_FCMGV for checking if the vehicle speed has exceeded a predetermined vehicle speed after starting of the engine by the starter. The expression "after starting of the engine by the starter" means after restarting (the same is true in the following description).

When it is determined that the flag F_FCMGV is "0", the flow returns. When it is determined that the flag F_FCMGV is "1", the flow advances to step S120 to check the state of a flag F_NGRMG for determining if the gear in use is other than the first gear. When this flag F_NGRMG is "0", that is, when it is determined that the vehicle has stopped during or after running on the first gear, the engine is not stopped because there may be a mode in which the vehicle starts right after stopping, such as a temporary stop mode. In this case, therefore, the flow returns. When it is determined that this flag F_NGRMG is "1", the state of a clutch-thrust keeping flag F_CLON is determined in step S121. When the clutch-thrust keeping flag F_CLON is "0", the flow returns.

When it is determined that the clutch-thrust keeping flag F_CLON is "1", the flow advances to step S129 to set the engine-stop control execution flag F_FCMG to "1" after which the flow returns. This causes the engine to stop when the vehicle is stopped without gear change with the clutch kept thrust at a gear position other than the first gear and reverse gear.

When it is determined in step S116 that the vehicle speed V is equal to or higher than the engine-stop-at-low-speed determining vehicle speed VIDLST, the flag F_FCMGV for checking if the vehicle speed has exceeded a predetermined vehicle speed after starting of the engine by the starter is set to "1", and the restart flag F_IDLREST for restarting the engine by opening the throttle is set to "0" in step S122. Then, the flow advances to step S123.

In step S123, the vehicle speed V is compared with a vehicle speed upper limit VFCMGST (e.g., 20 km/h) for maintaining fuel supply cut during deceleration. When it is determined that the vehicle speed V is equal to or higher than the vehicle speed upper limit VFCMGST, the flow advances to step S104. When it is determined that the vehicle speed V is lower than the vehicle speed upper limit VFCMGST, the flow advances to step S124 to determine the state of the neutral keeping flag F_NDLY.

When it is determined that the neutral keeping flag F_NDLY is "1", the flow advances to step S129. When it is determined that the neutral keeping flag F_NDLY is "0", the flow moves to step S125. In step S125, the state of the flag F_NGRMG is checked to determine if a gear other than the first gear has been used. When this flag F_NGRMG is "0", the flow returns.

When the flag F_NGRMG is "1", the flow advances to step S126 to determine the state of a flag F_CLNE indicating that the engine speed NE at the time the clutch is thrust is greater than a predetermined value. The predetermined value here is, for example, 700 rpm.

When the engine speed NE at the time the clutch is thrust is greater than the predetermined value, it is determined that the flag F_CLNE is "0". In this case, the flow returns. When it is determined that the flag F_CLNE which indicates the result of the comparison of the engine speed NE at the time of thrusting the clutch with the predetermined value is "1", that is, when the clutch is free at an engine speed lower than the predetermined engine speed NE, fuel supply cut during deceleration is maintained. Then, the state of a flag F_FCBRK indicating the brake having been released while fuel supply cut in deceleration is kept is determined in step S127.

When it is determined that this flag F_FCBRK is "1", the flow returns. When it is determined that this flag F_FCBRK is "0", the state of the brake switch is determined in step S128. When it is determined that the brake switch is "OFF", the flow returns. When it is determined that the brake switch is "ON", the engine-stop control execution flag F_FCMG is set to "1" in step S129, after which the flow returns.

Figure 4:
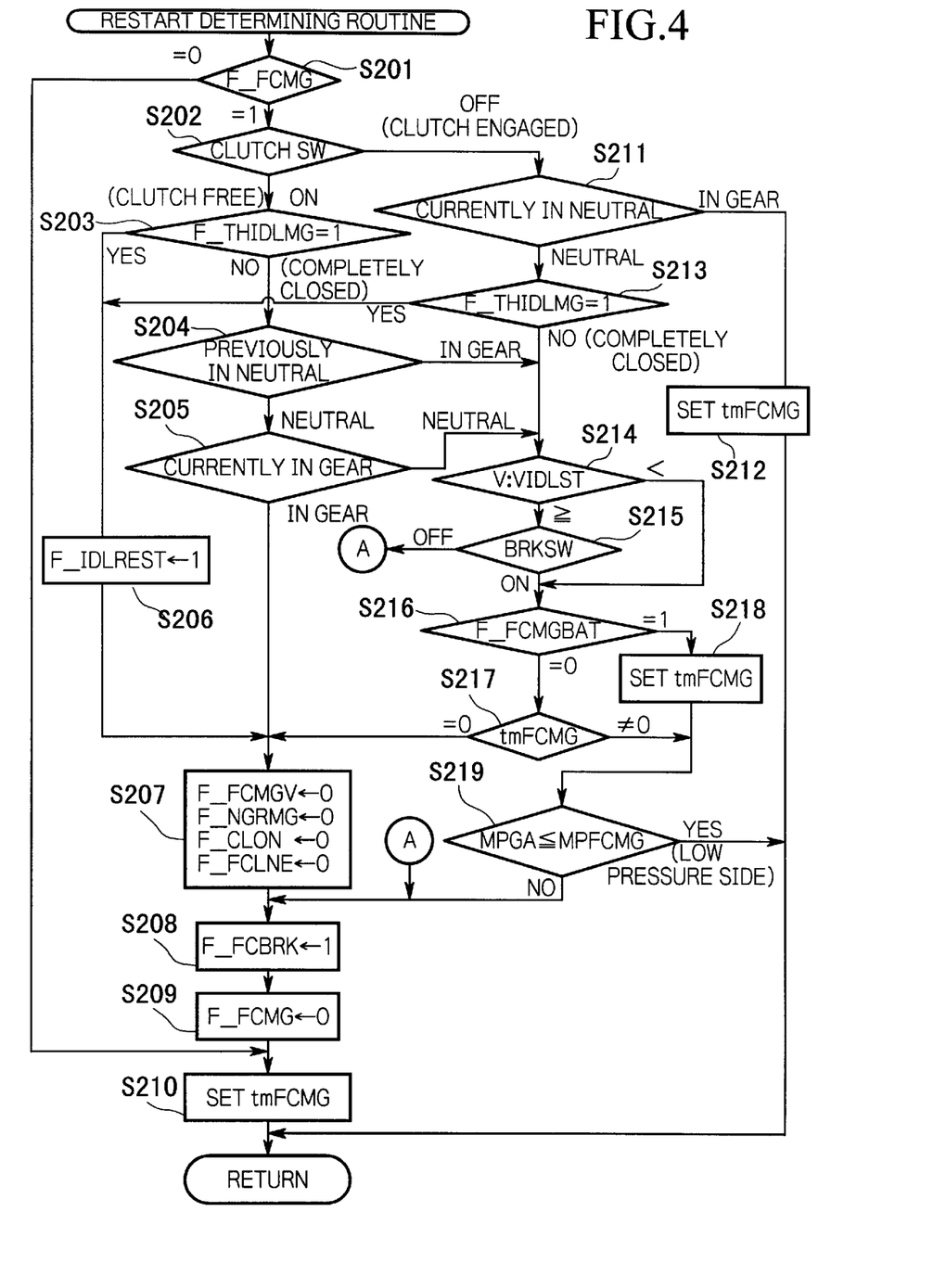
FIG. 4 is a flowchart illustrating a routine for determining whether or not to restart the MT vehicle.

FIG. 4 is a flowchart illustrating a routine for determining whether or not to restart the engine of an MT vehicle.

In the first step S201, the state of the engine-stop control execution flag F_FCMG is checked. Because the restart determination is performed when fuel supply cut by stopping the engine continues, when the engine-stop control execution flag F_FCMG is "0", this flowchart is passed, a restart-inhibiting delay timer tmFCMG when the remaining charge SOC of the battery goes below the lower limit is set in step S210, and the flow returns.

When the engine-stop control execution flag F_FCMG is "1", it is determined in step S202 whether the clutch switch is "ON" or "OFF". When in step S202 the clutch switch is "ON", that is, when it is determined that the clutch is free, it is then determined in step S203 if the throttle-completely-closed-state flag F_THIDLMG is "1."

When in step S203 the throttle-completely-closed-state flag F_THIDLMG is "1", that is, when it is determined that the throttle is not completely closed, the flow advances to step S206. In step S206, engine restart or returning from the fuel supply cut state is performed by opening the throttle and the restart flag F_IDLREST is set to "1". Stopping the engine or keeping fuel supply cut is therefore avoided by setting the flag this way.

In step S207, the flag F_FCMGV for checking if the vehicle speed has exceeded the predetermined vehicle speed after starter-oriented starting, the flag F_NGRMG for checking if the gear in use is other than the first gear, the clutch-thrust keeping flag F_CLON and the flag F_CLNE for checking if the engine speed NE at the time of thrusting the clutch is greater than the predetermined value are set to "0." In step S208, the flag F_FCBRK which indicates that the brake has been released during deceleration fuel supply cut is set to "1." In step S209, the engine-stop control execution flag F_FCMG is set to "0" after which the flow advances to step S210, and then the flow returns. This scheme prevents stopping of the engine, or fuel supply cut from being carried out again in other cases than the case where the gear is set to the neutral position again.

When in step S203 the throttle-completely-closed-state flag F_THIDLMG is "0", that is, when it is determined that the throttle is completely closed, the flow advances to step S204 to determine if the gear has previously been in the neutral position. When it is determined in step S204 that the previous gear position is the neutral one, it is then determined in step S205 if the transmission is currently in gear. When it is determined that the transmission is currently in gear, the flow advances to step S207 to restart the engine or return from the fuel supply cut state.

When it is determined in step S204 that the transmission has previously been in gear or it is determined in step S205 that the transmission is currently in neutral, the flow moves to step S214.

When in step S202 the clutch switch is "OFF", that is, it is determined that the clutch is engaged, it is then determined in step S211 if the transmission is currently in neutral. When it is determined in step S211 that the transmission is currently in gear, the flow returns after setting the restart-inhibiting delay timer tmFCMG in step S212. When it is determined in step S211 that the transmission is currently in neutral, it is determined in step S213 if the throttle-completely-closed-state flag F_THIDLMG is "1".

When it is determined in step S213 that the throttle-completely-closed-state flag F_THIDLMG is "1", the flow advances to step S206. If it is determined in step S211 that the transmission is in neutral and it is determined in step S213 that the throttle is thrust, restarting the engine or returning from the fuel supply cut state is carried out. When it is determined that the throttle-completely-closed-state flag F_THIDLMG is not "1" or the throttle is completely closed, the flow goes to step S214.

In step S214, the vehicle speed V is compared with the engine-stop-at-low-speed determining vehicle speed VIDLST. When it is determined that the vehicle speed V is lower than the engine-stop-at-low-speed determining vehicle speed VIDLST, the flow advances to step S216. When it is determined that the vehicle speed V is equal to or higher than the engine-stop-at-low-speed determining vehicle speed VIDLST, it is determined in step S215 if the brake switch is "ON" or "OFF". When in step S215 the brake switch is "OFF", the flow goes to step S208. When the brake is released during fuel supply cut while running, therefore, the engine returns from the fuel supply cut state. When the brake switch is "ON", on the other hand, the flow goes to step S216.

In step S216 is determined the flag F_FCMGBAT for determining whether or not to restart the engine based on the reduction in the remaining charge of the battery. When the restart flag F_FCMGBAT is "0", that is, when it is determined that the engine should be restarted because the battery's remaining charge has dropped, the flow advances to step S217.

When in step S216 the restart flag F_FCMGBAT is "1", that is, it is determined that restarting of the engine is unnecessary, the restart-inhibiting delay timer tmFCMG is set in step S218, and the flow then goes to step S219.

In step S217, the state of the restart-inhibiting delay timer tmFCMG is checked.

When in step S217 the restart-inhibiting delay timer tmFCMG is "0", the flow advances to step S207. When it is determined that the restart-inhibiting delay timer tmFCMG is not equal to "0", the flow advances to step S219.

In step S219, the absolute value of the brake-master-power negative pressure MPGA is compared with the absolute value of the brake-master-power negative pressure upper limit #MPFCMG (e.g., −430 mmHg). It is desirable that the brake-master-power negative pressure upper limit #MPFCMG be −465 mmHg, for example, when the vehicle is stopped, and be −540 mmHg when the vehicle is running in which state the negative pressure is easily secured.

When it is determined in this step that the brake-master-power negative pressure MPGA is equal to or lower than the brake-master-power negative pressure upper limit #MPFCMG ("YES"), a sufficient negative pressure is secured so that the flow returns without restarting the engine.

When it is determined that the brake-master-power negative pressure MPGA is closer to the atmospheric pressure than the brake-master-power negative pressure upper limit #MPFCMG ("NO"), the flow advances to step S208 to restart the engine.

In the case that the negative pressure of the brake-master-power negative pressure is likely to be gone due to pumping of the brake applied during stopping of the engine or the fuel supply cut process, the engine is restarted or the engine returns from the fuel supply cut state in order to secure the brake force, so that the brake-master-power negative pressure MPGA is secured. This can relieve the burden that would otherwise be placed placed on the driver due to an insufficient brake-master-power negative pressure MPGA.

Figure 5:
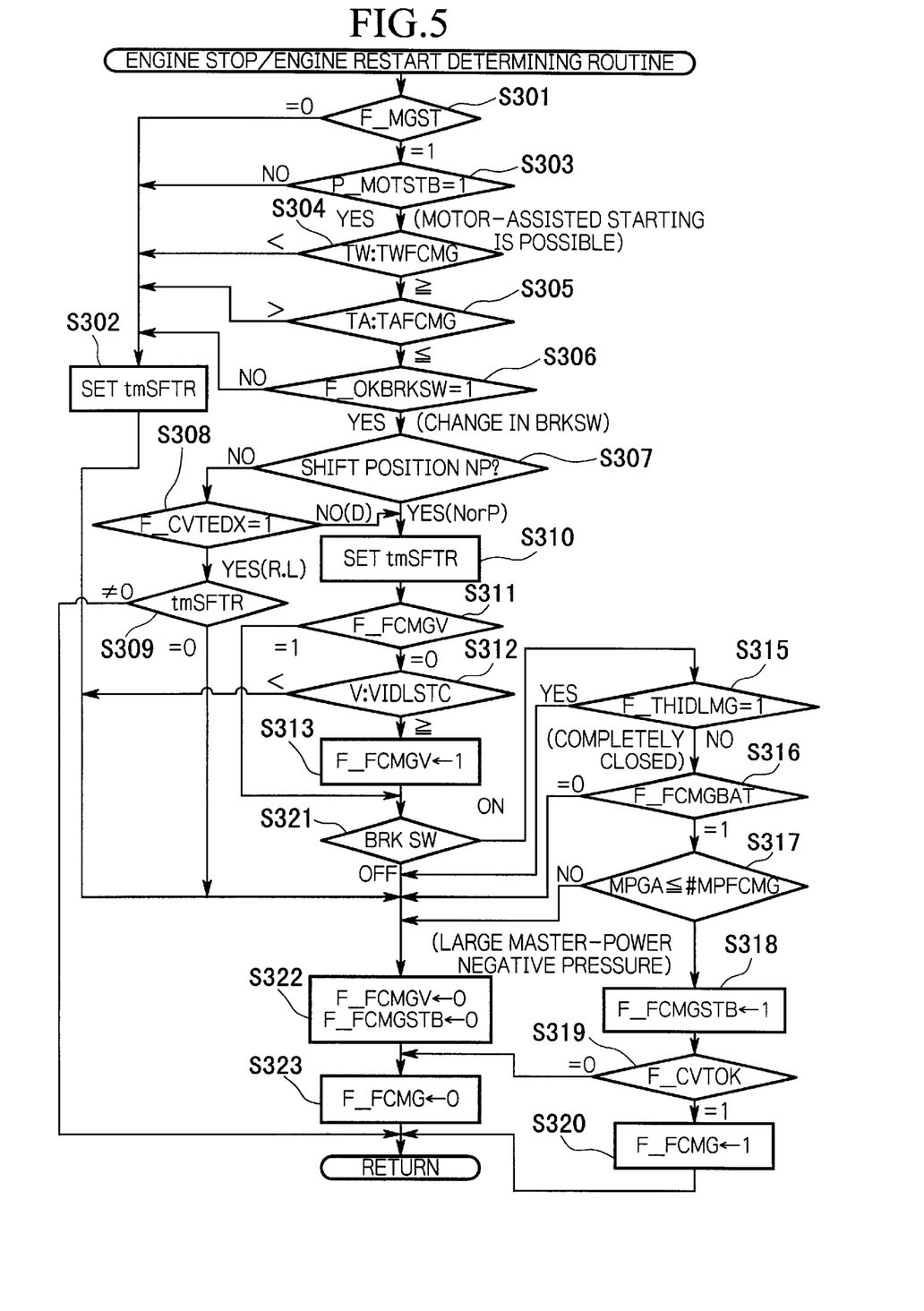
FIG. 5 is a flowchart showing a routine for a determination of the engine stop/engine restart of a CVT vehicle.

The following describes the engine stop/engine restart determination for a CVT vehicle. FIG. 5 is a flowchart showing a routine for the determination of engine stop/engine restart of a CVT vehicle.

In step S301 in this figure, the state of the start-switch-ON start flag F_MGST is checked. When the start-switch-ON start flag F_MGST is "0", that is, when it is determined that it is the first running, a timer tmSFTR for waiting for stabilization of a change in shift range is set in step S302. In step S322, both the flag F_FCMGV for checking if the vehicle speed has exceeded a predetermined vehicle speed after starting of the engine by the starter and an engine-stop request flag F_FCMGSTB for the CVT are set to "0." Then, the engine-stop control execution flag F_FCMG is set to "0" in step S323 and the flow returns.

When in step S301 the start-switch-ON start flag F_MGST is "1", that is, when it is determined that it is not the first running, it is determined in step S303 whether or not communication information P_MOTSTB from the motor ECU 3 is "1". This communication information P_MOTSTB indicates that the motor-assisted starting of the engine is possible when it is "1", and indicates the motor-assisted starting of the engine is not possible when it is When in step S303 the communication information P_MOTSTB is "1", the coolant temperature TW is compared with the coolant-temperature lower limit TWFCMG below which the engine is to be stopped in the next step S304.

When it is determined that the coolant temperature TW is lower than the coolant-temperature lower limit TWFCMG, the flow advances to step S302. This prevents the engine from being stopped when the engine is not fully warmed up. When it is determined that the coolant temperature TW is equal to or higher than the coolant-temperature lower limit TWFCMG, the intake-air temperature TA is compared with the intake-air temperature upper limit TAFCMG above which the engine is to be stopped in step S305.

When it is determined that the intake-air temperature TA is higher the intake-air temperature upper limit TAFCMG, the flow advances to step S302. As a result, the engine is not stopped in consideration of the deterioration of the startability and the air conditioning performance that should be secured. When it is determined that the intake-air temperature TA is equal to or lower than the intake-air temperature upper limit TAFCMG, the flow proceeds to step S306.

In the next step S306, the state of the brake-switch-OK flag F_OKBRKSW is checked. This step checks if the brake switch is functioning properly, and a flag value of "1" is set when the switch is not failing. When it is determined that the brake switch is normal, the flow advances to step S307. When the brake switch is abnormal and the flag value is "0", the flow goes to step S302.

In step S307, it is determined if the shift position is in the N (Neutral) range, P (Parking) range or in another range.

When it is determined that the shift position is in a range other than the N range and P range, the state of a drive-range flag F_CVTEDX is determined in step S308. This drive-range flag F_CVTEDX indicates the D range when the decision value is "0" and indicates the R range or other ranges when the decision value is "1."

When in step S308 the drive-range flag F_CVTEDX is "1", the flow goes to step S310 to stop the engine. When the drive-range flag F_CVTEDX is "0", on the other hand, it is determined in step S309 if the shift-range stabilization waiting timer tmSFTR is "0." When in S309 the shift-range stabilization waiting timer tmSFTR is "0", the flow advances to step S322. When the shift-range stabilization waiting timer tmSFTR is not "0", the flow returns.

As the shift-range stabilization waiting timer tmSFTR is provided, even when the shift position passes the R range at the time the gear is shifted between the D range and the P range, the number of times of the engine is stopped by releasing the stopping of the engine is not reduced.

When it is determined in step S307 that the shift range is in the N range or the P range, the shift-range stabilization waiting timer tmSFTR is set in the next step S310 to stop the engine.

In the subsequent step S311 is checked the state of the flag F_FCMGV for checking if the vehicle speed has exceeded a predetermined vehicle speed after starting of the engine by the starter.

When it is determined that the flag F_FCMGV is "0", the flow advances to step S312 where vehicle speed V is compared with an engine-stop-at-low-speed determining vehicle speed VIDLSTC (e.g., 15 km/h).

When it is determined in step S312 that the vehicle speed V is lower than the engine-stop-at-low-speed determining vehicle speed VIDLSTC, the flow advances to step 322. When it is determined that the vehicle speed V is equal to or higher than the engine-stop-at-low-speed determining vehicle speed VIDLSTC, the flag F_FCMGV is set to "1" in step S313.

Those steps S311, S312 and S313 do not set the flags, that have been initialized (step S322) by restarting after the engine was stopped, to "1" until the vehicle speed V exceeds the engine-stop-at-low-speed determining vehicle speed VIDLSTC.

In a case of heavy traffic, temporary stopping and restarting or the like, stopping and restarting are likely to be frequently repeated. As in step S119 for an MT vehicle, therefore, once the engine is restarted, it will not be stopped again until it runs for a certain distance.

In step S321, the state of the brake switch is determined. When it is determined that the brake switch is "ON", the flow advances to step S315 to check the state of the throttle-completely-closed-state flag F_THIDLMG. When the throttle-completely-closed-state flag F_THIDLMG is "1", that is, when it is determined that the throttle is not completely closed, the flow goes to step S322. As a result, the engine is not stopped. When the throttle-completely-closed-state flag F_THIDLMG is "0", that is, when it is determined that the throttle is completely closed, the flow goes to step S316 to check the state of the flag F_FCMGBAT for determining whether or not to restart the engine based on the reduction in the remaining charge of the battery When this flag F_FCMGBAT is "0", that is, when it is necessary to restart the engine as a result of the battery's remaining charge having fallen, the flow goes to step S322. When the flag F_FCMGBAT is "1", that is, when restarting the engine originating from the reduction in the battery's remaining charge is unnecessary, the flow goes to step S317.

In step S317, the absolute value of the brake-master-power negative pressure MPGA is compared with the absolute value of the brake-master-power negative pressure upper limit #MPFCMG for determining whether to stop the engine.

When it is determined in this step that the brake-master-power negative pressure MPGA is equal to or lower than the brake-master-power negative pressure upper limit #MPFCMG ("YES"), the flow advances to step S318 to stop the engine.

When it is determined that the brake-master-power negative pressure MPGA is closer to the atmospheric pressure than the brake-master-power negative pressure upper limit #MPFCMG ("NO"), the flow goes to step S322 to restart the engine.

In the case that the negative pressure of the brake-master-power negative pressure is likely to be gone due to pumping of the brake applied during stopping of the engine or the fuel supply cut process, the engine is restarted or the engine returns from the fuel supply cut state in order to secure the brake force, so that the brake-master-power negative pressure MPGA is secured. This can relieve the burden that would otherwise be put on the driver due to an insufficient brake-master-power negative pressure MPGA.

Then, the engine-stop request flag F_FCMGSTB is set to "1" in step S318, and the state of a CVT-engine stop-OK flag F_CVTOK is checked in step S319. When the CVT-engine stop-OK flag F_CVTOK is "1", that is, when it is determined that the engine is ready to be stopped, the engine-stop control execution flag F_FCMG is set to "1", and then the flow returns. When the CVT-engine stop-OK flag F_CVTOK is "0", that is, when it is determined that the engine is not ready to be stopped, the engine-stop control execution flag F_FCMG is set to "0", after which the flow returns.

In the step S321, the state of the brake switch is checked. When it is determined that the brake switch is "OFF", both the flag F_FCMGV for checking if the vehicle speed has exceeded a predetermined vehicle speed after starting of the engine by the starter, and the engine-stop request flag F_FCMGSTB to the CVT are set to "0" Then, the engine-stop control execution flag F_FCMG is set to "0", after which the flow returns.

Figure 6:
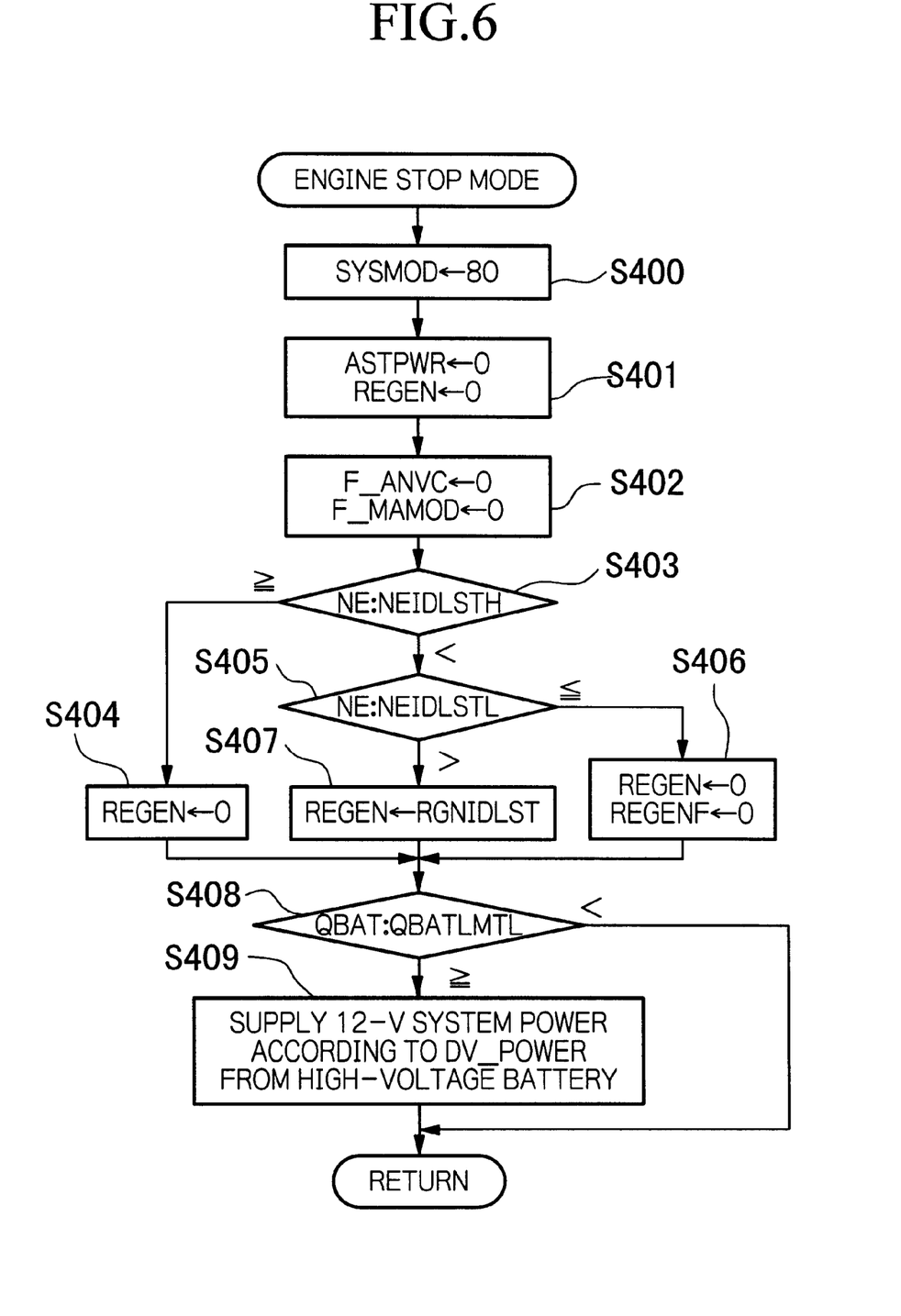
FIG. 6 is a flowchart for an engine stop mode.

An engine stop mode will now be discussed with reference to the flowchart in FIG. 6. This engine stop mode is initiated when the engine-stop control flag F_FCMG is set to "1" in step S129 and step S320.

In step S400, "0" is set in a mode display RAM and the engine stop mode is selected as the motor operation mode and information to that effect is output to the motor ECU 3. In the next step 5401, initialization for switching the mode is carried out. Specifically, both a motor assist amount ASTPWR and a motor generation amount REGEN are set to "0."

Next, in step S402, flags F_ANVC and F_MAMOD in the motor ECU 3 are set to "0", and a motor mode flag signal is sent to the motor ECU 3. Then, the flow advances to step S403.

In step 5403, the engine speed NE is compared with the engine-stopping/enforced-regeneration-starting upper speed limit NEIDLSTH (e.g., 600 rpm). When the engine speed NE is equal to or higher than the engine-stopping/enforced-regeneration-starting upper speed limit NEIDLSTH, the motor generation amount REGEN is set to "0" in step S404, and no power is generated. This is because, when the engine speed NE is equal to or higher than the engine-stopping/ enforced-regeneration-starting upper speed limit NEIDLSTH, the resonance points of the vehicle body and the drive system do not match with each other so that no vibrations due to resonance occur in the vehicle, and therefore the enforced regeneration is unnecessary.

When in step S403 the engine speed NE is lower than the engine-stopping/enforced-regeneration-starting upper speed limit NEIDLSTH, the engine speed NE is compared with the engine-stopping/enforced-regeneration-starting lower speed limit NEIDLSTL in step S405.

When in step S405 the engine speed NE is equal to or lower than the engine-stopping/enforced-regeneration-starting lower speed limit NEIDLSTL, both the motor generation amount REGEN and a motor generation final amount REGENF are set to "0" in step S406 and no power is generated. This is because in this case too, the resonance points of the vehicle body and the drive system do not coincide with each other so that no vibrations due to resonance occur in the vehicle, and therefore the enforced regeneration is unnecessary.

In other words, between the engine-stopping/enforced-regeneration-starting upper speed limit NEIDLSTH and the engine-stopping/enforced-regeneration-starting lower speed limit NEIDLSTL is the range for the engine speed NE where the vehicle body and the drive system resonate, causing uncomfortable vibrations.

When in step S405 the engine speed NE is higher than the engine-stopping/enforced-regeneration-starting lower speed limit NEIDLSTL, the motor generation amount REGEN is set to an engine-stop/enforced-generation amount RGNIDLST (e.g., 6 kw) in step S407. This setting of REGEN causes regeneration which applies a load to the engine.

Figure 7:
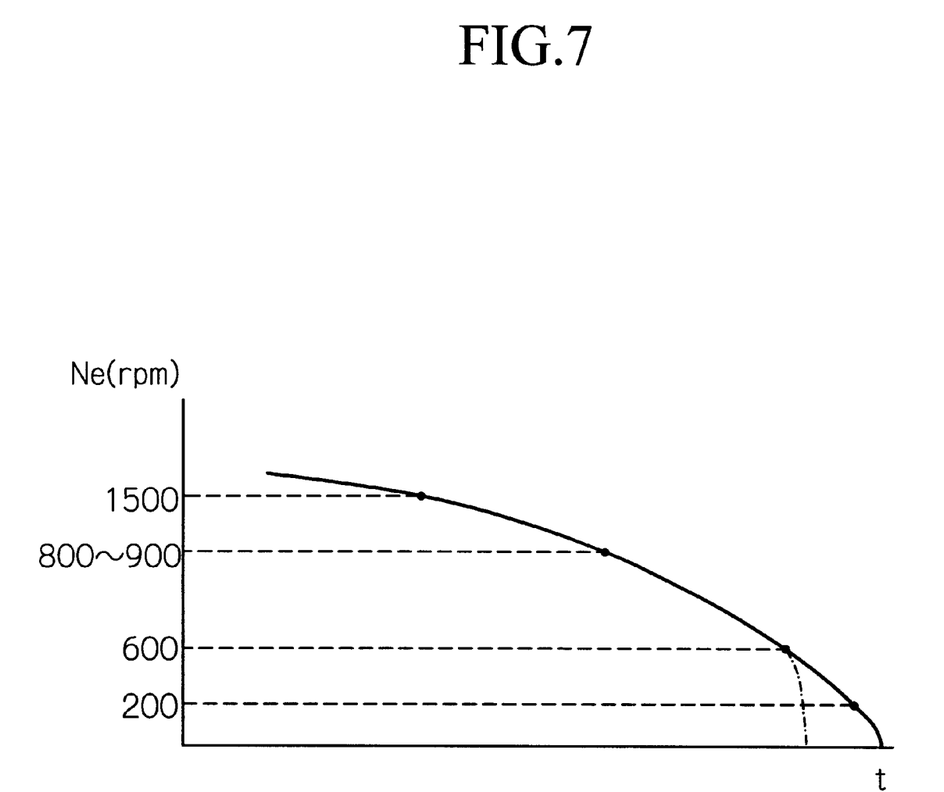
FIG. 7 is a graph showing the relationship between the engine speed and time.

In the case where fuel cutting continues even at the fuel supply restarting engine speed (e.g., 1500 rpm) at which the engine stops fuel cutting and the engine speed NE keeps decreasing even after falling below the idling speed (800 to 900 rpm) as shown in FIG. 7, when the engine speed NE comes between the engine-stopping/enforced-regeneration-starting upper speed limit NEIDLSTH and the engine-stopping/enforced-regeneration-starting lower speed limit NEIDLSTL, uncomfortable vibration should occur on the vehicle body. But, actually the generation of power by the idling-stop/enforced-generation amount RGNIDLST applies a load to the engine. As a result, the engine speed abruptly drops as indicated by the one-dot chain line in the figure, making the occurrence of uncomfortable vibration on the vehicle body extremely short. Therefore, hardly any vibration occurs.

In the subsequent step S408, a high-voltage battery capacity QBAT is compared with a high-voltage battery capacity lower limit QBATLMTL for determining if generation by the motor is possible.

When the high-voltage battery capacity QBAT is equal to or greater than the high-voltage battery capacity lower limit QBATLMTL, the high-voltage battery capacity QBAT is sufficient so that 12V power according to the downverter power is supplied from the high-voltage battery in step S409.

When in step S408 the high-voltage battery capacity QBAT is smaller than the high-voltage battery capacity lower limit QBATLMTL, the flow returns in order to avoid the condition that the motor cannot restart the engine.

When the engine speed approaches the level where the vehicle starts making uncomfortable vibration, power is generated by the motor to apply a load on the engine, thereby swiftly reducing the engine speed and stopping the engine. This can allow the engine to leave the state in which the engine speed causes uncomfortable vibrations. This prevents the driver from experiencing uncomfortable vibration.

According to this invention, as described above, when fuel supply to the engine is stopped by the fuel cutter and the engine speed falls to or below a predetermined speed, the vehicle body tends to vibrate. At this point in time, the motor is permitted to work as a generator to apply a load to the engine and fuel is cut, thereby rapidly reducing the engine speed to "0". This can greatly shorten the time during which the engine speed falls within the resonance frequency band and can prevent uncomfortable vibrations from occurring in the vehicle body.

When vibration with a large amplitude tends to occur at a speed equal to or lower than the idling speed, the motor is permitted to work as a generator to apply a load to the engine, thereby promptly making the engine speed "0". This can make very short the time during which the engine speed falls within the resonance frequency band, and can allow the engine to quickly leave the resonance frequency band. It is therefore possible to prevent the occurrence of such uncomfortable vibrations with large amplitude.

Further, even when the engine speed reaches the fuel supply restarting engine speed, engine stop control is carried out. This can suppress the occurrence of uncomfortable vibrations to an extremely short time.

What is claimed is:

1. An engine control system for a hybrid vehicle having an internal combustion engine and an electric motor connected to a drive shaft of said engine as driving force sources, for permitting stopping and restarting of said engine in accordance with predetermined drive conditions, the engine control system comprising:

a fuel cutter for cutting fuel supply to said engine when said vehicle decelerates; and an engine speed detector for detecting an engine speed, wherein stopping said engine is initiated by cutting the fuel supply by said fuel cutter, and when said engine speed becomes equal to or less than a predetermined speed during the cutting of the fuel supply, said engine is stopped by operating said motor as generator to suppress vibration in a resonance frequency band of a vehicle body and a drive system in said hybrid vehicle.

2. The engine control system according to claim 1, wherein said predetermined speed is set in said resonance frequency band and is equal to or less than an idling speed.

3. The engine control system according to claim 1 or 2, wherein a fuel supply restarting engine speed for restarting fuel supply is set in said fuel cutter, and once the engine stop control is initiated, engine stop control is maintained and the fuel cutting continues even when the engine speed reaches the fuel supply restarting engine speed.

* * * * *